United States Patent [19]
Kaise et al.

[11] Patent Number: 6,002,459
[45] Date of Patent: Dec. 14, 1999

[54] LIQUID CRYSTAL PANEL HAVING MICRO-LENS ARRAY WITH EXTENDED FOCAL LENGTH AND DISPLAY APPARATUS HAVING THE SAME

[75] Inventors: Kikuo Kaise; Shizuo Nishihara; Toshihiro Fukuda; Mikiya Kobayashi, all of Kanagawa, Japan

[73] Assignee: Sony Corporation, Tokyo, Japan

[21] Appl. No.: 08/975,107

[22] Filed: Nov. 20, 1997

[30] Foreign Application Priority Data

Nov. 28, 1996 [JP] Japan ................................. 8-318060

[51] Int. Cl.$^6$ ............................................. G02F 1/1335
[52] U.S. Cl. ................................................ 349/95; 349/5
[58] Field of Search ........................................... 349/5, 95

[56] References Cited

U.S. PATENT DOCUMENTS

| | | | |
|---|---|---|---|
| 5,052,783 | 10/1991 | Hamada | 359/40 |
| 5,161,042 | 11/1992 | Hamada | 359/41 |
| 5,543,942 | 8/1996 | Mizuguchi et al. | 359/40 |
| 5,548,349 | 8/1996 | Mizuguchi et al. | 348/766 |

FOREIGN PATENT DOCUMENTS

| | | |
|---|---|---|
| 0516479 | 12/1992 | European Pat. Off. . |
| 0570176 | 11/1993 | European Pat. Off. . |
| 0718665 | 6/1996 | European Pat. Off. . |
| WO 96/02113 | 1/1996 | WIPO . |

OTHER PUBLICATIONS

"Asia Display'95", Proceedings of the Fifteenth International Display Research Conference, Oct. 16 to 18, 1995, pp. 887 to 890.

*Primary Examiner*—William L. Sikes
*Assistant Examiner*—Robert J. Hollingshead
*Attorney, Agent, or Firm*—Ronald P. Kananen; Rader, Fishman & Grauer

[57] ABSTRACT

According to a liquid crystal panel of the present invention, the focal length of micro-lenses is set to be longer than the distance between the micro-lens array and the first substrate, while light collected by each micro-lens is arranged to focus inside the first substrate. Thus, the divergence angle after focusing can be reduced. Therefore, the maximum light-emerging angle from the LCD panel can be reduced, and eclipse of the light which causes chrominance or luminance non-uniformity does not occur even when a lens having a high F number is used as a projection lens.

12 Claims, 6 Drawing Sheets

LIQUID CRYSTAL PANEL HAVING MICRO-LENS ARRAY WITH EXTENDED FOCAL LENGTH AND DISPLAY APPARATUS HAVING THE SAME

BACKGROUND OF THE INVENTION

1. Field of the Invention

The present invention relates to liquid crystal panels, which have collecting micro-lenses opposing pixel electrodes driving liquid crystal pixels so as to achieve higher luminance, and projection type display devices using such liquid crystal panels.

2. Description of the Related Art

Recently, liquid crystal projectors and liquid crystal projection TVs, in which an image on a liquid crystal panel is projected onto a screen by a magnifying optical projection system utilizing a liquid crystal panel as an optical switching element, have been popularly developed. These apparatuses are advantageous in that they are thin and lightweight, have sharp images, are not affected by earth's magnetic field, and do not require registration adjustment.

Such liquid crystal display devices are classified into single-panel systems composed of a liquid crystal panel having color filters for three colors, i. e., B (blue), R (red), and G (green), and three-panel systems having monochrome liquid crystal panels for the B, R, and G optical paths. According to the single-panel systems, a compact and lightweight liquid crystal device can be readily formed at a lower cost because of its simple structure. However, since the color filters absorb a large amount of light, it is difficult to achieve higher luminance and efficient cooling.

To solve such problems, for example, Japanese Patent Laid-Open No. 4-60538 (hereinafter referred to as "document (i)") and "ASIA DISPLAY '95, p 887" (hereinafter referred to as "document (ii)") disclose color liquid crystal display devices in which collecting micro-lenses are arranged as follows: one collecting micro-lens opposes every three pixel electrodes driving liquid crystal pixels, and light beams of three colors, i. e., B, R, and G, enter each of the micro-lenses from mutually different directions so as to be collected, and the resultant emerging light beam of each color enters a pixel electrode corresponding to the color of the emerging light beam. In this color liquid crystal display device, light beams which would normally enter the regions between the pixels (the matrix of opaque regions in which thin-film transistors (TFTs) are formed as pixel driving elements) can be effectively utilized so that the effective aperture ratio increases, thereby achieving a higher luminance.

According to such color liquid crystal display devices, the focal points of the micro-lenses opposing the pixel electrodes are positioned near the corresponding pixel portions. In other words, collimated light entering the micro-lens is collected to focus near the pixel portion, and then, diverges again.

Although data projectors and rear projection TVs based on the liquid crystal projection system have already been put into practical use, it is supposed that with the development of multi-media, these devices are required to display computer and AV (audio-video) images on the same panel at a resolution as high as that of high-definition televisions. In such a case, the optical system including the liquid crystal display elements must have higher resolution, higher image quality, and higher luminance as compared with conventional optical systems. For example, a liquid crystal display panel employed in presently used rear-projection TVs uses TFTs made of amorphous silicon (a-Si), and the total number of pixels is approximately 1,300,000 or less in a picture size of 3 to 5 inches. However, to achieve thinner and lighter devices according to the liquid crystal projection system, it is necessary to increase the pixel density to approximately 1,500,000 to 2,000,000 pixels in a picture size of 2 inches. Moreover, such compact high-resolution LCD panels, including their optical system, are advantageous in reducing prices. Thus, a further increase in consumer demand is expected in the future. Concerning process techniques, it is supposed that high-temperature polysilicon (polycrystalline silicon) TFT techniques or low-temperature polysilicon TFT techniques become important for producing such high-resolution liquid crystal panels.

As mentioned above, there is a greater necessity to reduce the area of pixel portions in liquid crystal projectors to achieve higher resolution. Thus, from now on, the TFTs, as the pixel driving elements, are required to be formed from polysilicon instead of amorphous silicon. This is because in the case of a-Si having low carrier-mobility, the size of the TFTs must increase to some extent for providing a certain amount of electric current for driving the pixels. Meanwhile in the case of polysilicon having high carrier-mobility, the size of the TFTs can be reduced. Practically, the pixel pitch is limited to approximately 100 $\mu$m in the case of a-Si, while a small pixel pitch of 20 $\mu$m can be employed in the case of polysilicon.

Figure 5:
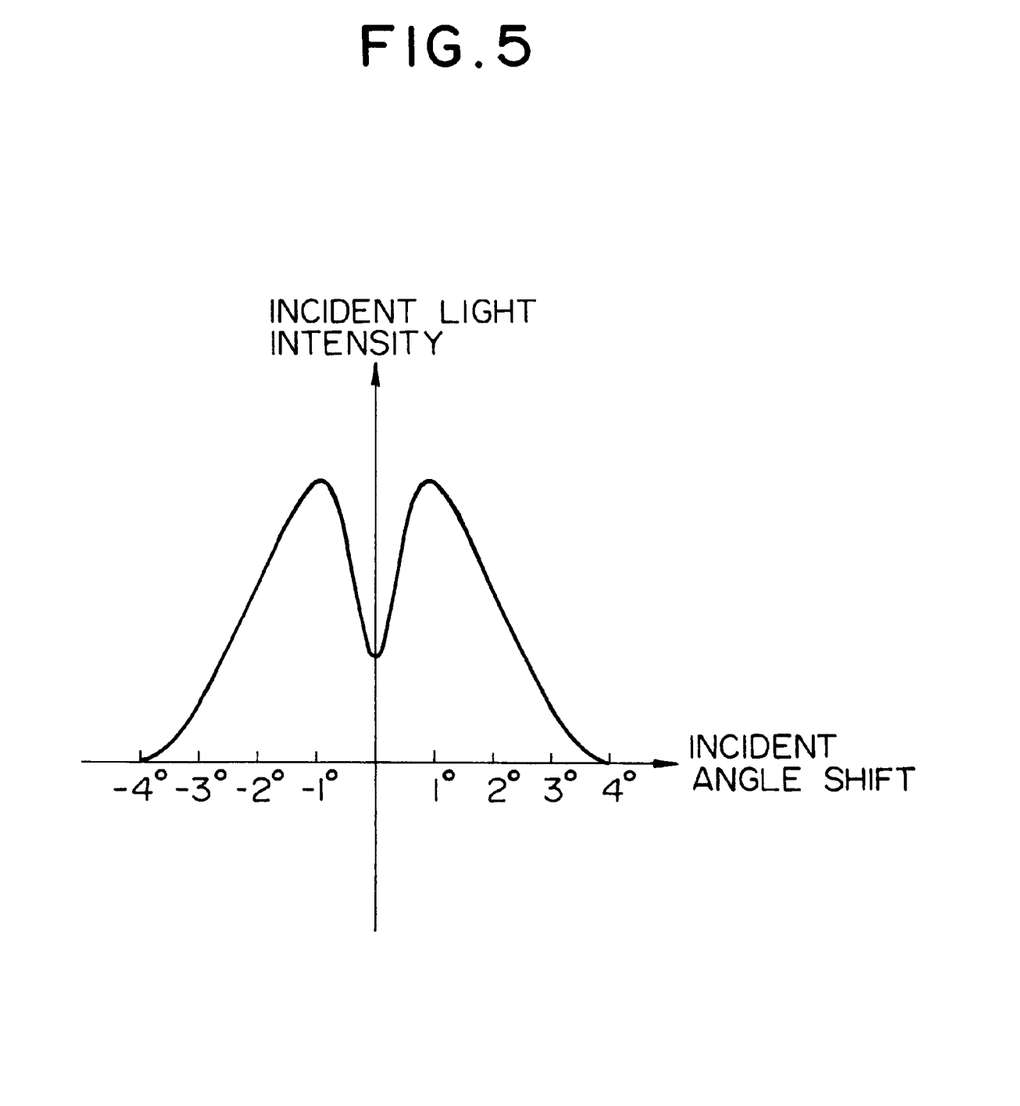
FIG. 5 is a graph illustrating the relationship between the shift of the incident angle and the incident light intensity.

With such a reduction in the pixel area, the collecting diameter of the micro-lenses is required to be correspondingly smaller. Although, it is ideal that the light beams entering the micro-lenses from the projection optical system are completely parallel to the optical axis, in practice, the light beams are shifted from the parallel state by a small angle. Thus, light beams which should enter only one pixel reach the opaque regions between adjacent pixels, thereby reducing transmission efficiency. Consequently, the luminance of the display image decreases and the effects of the micro-lenses decline. Additionally, when a light beam, which should enters only one pixel for a certain color (e. g., the pixel for G), enters an adjacent pixel for another color (e. g., the pixel for R), so-called color mixing occurs and deteriorates the color image quality. For example, the incident light intensity and the shift between the original incident angle and the light beam entering a pixel of a certain color (e. g., the pixel for G) has the relationship shown in FIG. 5. The incident light intensity reaches its maximum value at angles slightly shifted from the original incident angle, as is shown in FIG. 5. Therefore, it is understood that the shift of the incident angle greatly affects the luminance and color mixing of the displayed images.

The larger the distance between each pixel portion and the corresponding micro-lens, the more significant the trend becomes. Therefore, with an increasing demand for high resolution, the distance between each pixel and the corresponding micro-lens must be correspondingly reduced. For achieving the above, the following methods can be employed: a method for reducing the focal length by decreasing the size of the micro-lenses while retaining their shape, and a method for reducing the focal length alone without changing the size of the micro-lenses. According to the former method, the aperture angle (the angle subtended by the lens diameter at the focal point) in the light-emerging side does not alter because the shape of the micro-lenses is retained. However, to design and produce such fine micro-lenses is not easy. Furthermore, it is not practical to reduce the size of the micro-lenses while retaining the shape, considering the relationship between the display-element format and other optical parts. Therefore, the focal length is required to decrease without greatly changing the lens diameter.

In such a case, the aperture angle can be raised by positioning the focal points at the pixel portion, as is mentioned above. The divergence angle of the emerging light beams from the micro-lens is thereby enlarged. Thus, to effectively utilize the entire light beams emerging from the liquid crystal panel without eclipsing, the F number of the projection lens positioned behind the liquid crystal panel must be considerably reduced, in other words, it is necessary to employ a bright lens system. This is because eclipses of light beams result in luminance or chrominance non-uniformity in images projected on a screen. However, it is generally difficult and costly to design and produce a lens system having a low F number, and thus the cost for the device as a whole increases.

SUMMARY OF THE INVENTION

Accordingly, it is an object of the present invention to provide liquid crystal panels at a low cost, which achieve high-resolution images without deteriorated image quality such as luminance or chrominance non-uniformity, and projection type display device using such liquid crystal panels.

A liquid crystal panel of the present invention comprises: a first substrate having pixel electrodes arranged in a matrix pattern; a second substrate opposing the first substrate, the second substrate having a transparent substrate, an opposing electrode opposing the pixel electrodes, and a micro-lens array provided between the transparent substrate and the opposing electrode; and a liquid crystal layer sandwiched between the first and second substrates; in which the focal length of micro-lenses composing the micro-lens array is set to be longer than the distance between the micro-lens array and the first substrate, and light collected by each of the micro-lenses is allowed to pass through the pixel electrodes and to focus inside the first substrate. The micro-lenses may be arranged such that each of the micro-lenses opposes each of the pixel electrodes or each micro-lens opposes a plurality of pixel electrodes in the first substrate. The liquid crystal panel may have a color filter provided between the opposing electrode and micro-lenses.

A projection type display device of the present invention comprises: a light source; a means for separating light emerging from the light source into a plurality of light beams having mutually different wavelength ranges; a liquid crystal panel in which the light beams enter, the liquid crystal panel having: a first substrate having pixel electrodes arranged in a matrix pattern; a second substrate opposing the first substrate, the second substrate comprising a transparent substrate, an opposing electrode opposing the pixel electrodes, and a micro-lens array provided between the transparent substrate and the opposing electrode; and a liquid crystal layer sandwiched between the first substrate and the second substrate; in which the focal length of micro-lenses composing the micro-lens array is set to be longer than the distance between the micro-lens array and the first substrate, and the light collected by each of the micro-lenses is allowed to pass through the pixel electrodes and to focus inside the first substrate; and a means for synthesizing each of the light beams, which have been transmitted through the liquid crystal panel and modulated therein, on a display screen. The micro-lenses may be arranged such that each micro-lens opposes a plurality of pixel electrodes in the first substrate. The means for separating the emerging light may be composed of dichroic mirrors, a hologram element, a diffraction grating, or a prism.

A projection type display device of the present invention comprises: a light source; a means for separating light emerging from the light source into a plurality of light beams having mutually different wavelength ranges; a plurality of liquid crystal panels in which the light beams enter, respectively, each of the liquid crystal panels comprising: a first substrate having pixel electrodes arranged in a matrix pattern; a second substrate opposing the first substrate, the second substrate having a transparent substrate, an opposing electrode opposing the pixel electrodes, and a micro-lens array provided between the transparent substrate and the opposing electrode; and a liquid crystal layer sandwiched between the first and second substrates; in which the focal length of micro-lenses composing the micro-lens array is set to be longer than the distance between the micro-lens array and the first substrate, and light collected by each of the micro-lenses is allowed to pass through the pixel electrodes and to focus inside the first substrate; and a means for synthesizing the light beams emerging from the corresponding liquid crystal panels on a display screen. The micro-lenses may be arranged such that each of the micro-lenses is allowed to oppose each of the pixel electrodes in the first substrate. Light beams of the primary colors R, G, and B may be incident on the corresponding liquid crystal panels.

According to a liquid crystal panel of the present invention, the focal length of the micro-lenses is set to be longer than the distance between the micro-lens array and the first substrate, while light collected by each micro-lens is arranged to focus inside the first substrate; thus the divergence angle after focusing can be reduced.

DESCRIPTION OF THE PREFERRED EMBODIMENT

The above and other objects, features and advantages of the present invention will be better understood from the following detailed description of the preferred embodiment taken in conjunction with the accompanying drawings.

Figure 1:
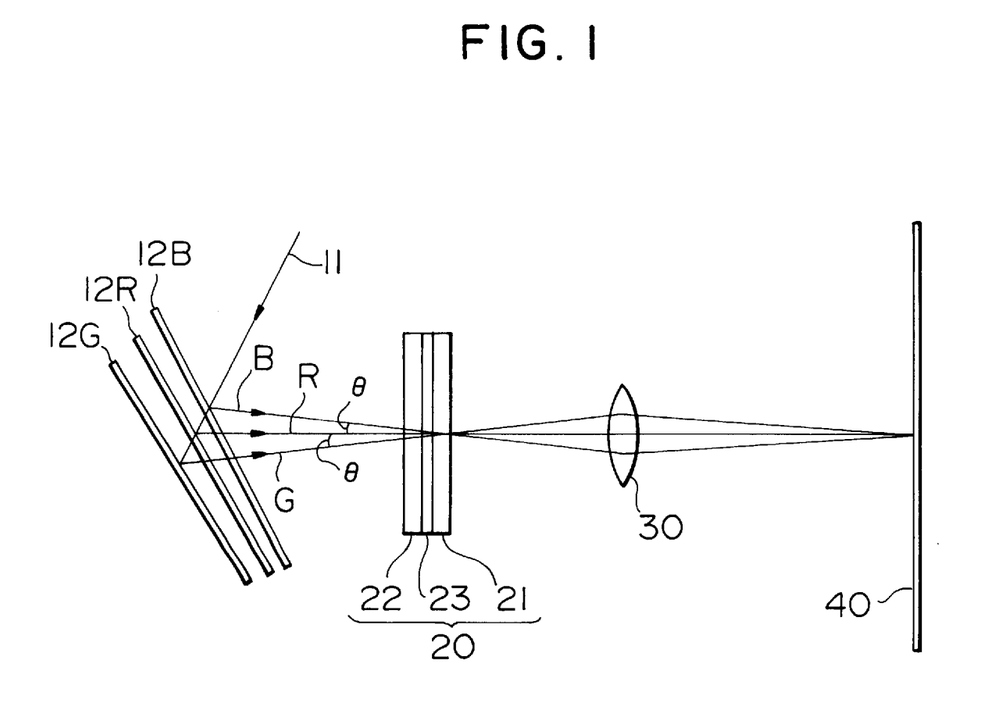
FIG. 1 is a diagram showing the main structure of a projection type liquid crystal display device of an embodiment incorporated in the present invention.

FIG. 1 shows the main structure of a color liquid crystal projector of an embodiment incorporated in the present invention. This device has: dichroic mirrors 12B, 12R, and 12G color-separating the parallel white light 11, coming from a white-light source (not shown in the figure), into a plurality of light beams having mutually different wavelength ranges, i. e., a B light beam, a R light beam, and a G light beam, respectively; an LCD panel 20 modulating the intensity of the B light beam, the R light beam, and the G light beam in response to color image signals; and a projection lens 30 collecting the light emerging from the LCD panel 20 for projection and color-synthesizing on a screen 40.

The parallel white light 11 is color-separated into light beams of B, R, and G having mutually different wavelength ranges by the dichroic mirrors 12B, 12R, and 12G, respectively. The dichroic mirrors 12B, 12R, and 12G are adjusted to have a small angle between each other so that these light beams enter the LCD panel 20 at mutually different angles. In this embodiment, the R light beam is allowed to perpendicularly enter the LCD panel 20, and the B light beam and the G light beam are arranged to enter the LCD panel 20 at angles of [+θ] and [−θ], respectively, with respect to the R light beam. The LCD panel 20, which will be explained in detail with reference to FIG. 2, has a first substrate 21 on which numerous pixel electrodes are arranged according to a matrix pattern, a second substrate 22 having an opposing electrode and micro-lenses (both are not shown in this figure), and a liquid crystal layer 23 sandwiched between the first substrate 21 and the second substrate 22.

The three types of light beams entering the LCD panel 20 perpendicularly, at [+θ] to the perpendicular direction, and at [−θ] to the perpendicular direction may be assigned to the B, R, and G light beams in any manner.

Although dichroic mirrors are used in this embodiment for color-separating the light into different wavelength ranges, holograms, diffraction gratings, prisms, etc. may be employed instead.

Figure 2:
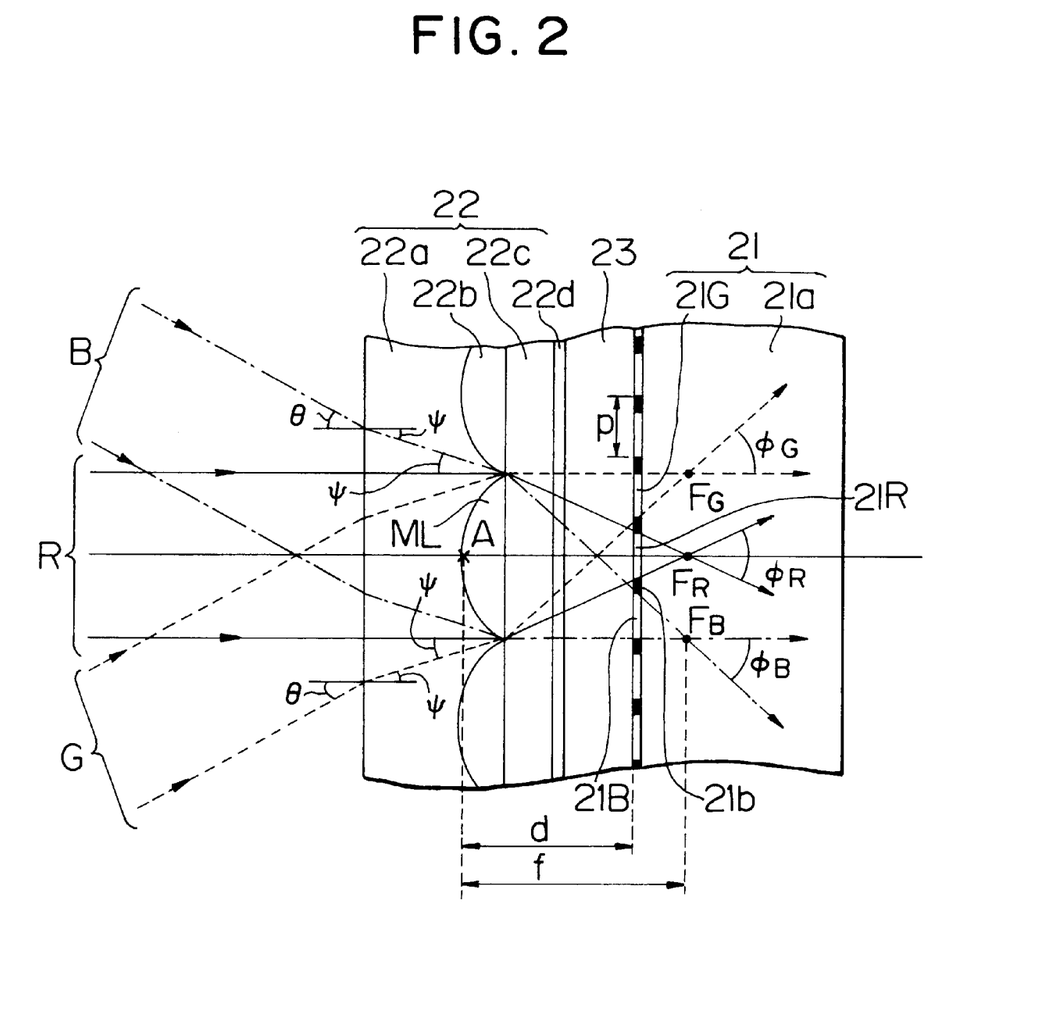
FIG. 2 is a cross-sectional diagram showing the structure and operation of the LCD panel of FIG. 1.

FIG. 2 is an enlarged diagram showing the cross-sectional structure of the LCD panel 20 of FIG. 1. As is shown in this figure, the first substrate 21 is composed of: a glass substrate 21a; a plurality of pixel electrodes 21B, 21R, and 21G arranged regularly from the bottom to the top of the figure on one side (light-incident side in this figure) of the glass substrate 21a according to a matrix pattern; and opaque regions 21b composed of TFTs (not shown in the figure) which are used as switching elements for applying a voltage to each of the pixel electrodes in response to the image signals. Each of the TFTs has a gate electrode, a drain electrode, and a source electrode (none of these is shown in the figure) made of, for example, polysilicon. The gate electrode is connected to an address line (not shown in the figure) running from the top to the bottom of the figure, the source electrode is connected to a data line (not shown in the figure) running in the direction perpendicular to the plane of the figure, and the drain electrode is connected to the corresponding pixel electrode 21B, 21R, or 21G. The alignment of the liquid crystal molecules in the portion of the liquid crystal layer 23 between a pixel electrode and an opposing electrode 22d is changed by selectively applying an image signal voltage to the pixel electrode which is chosen by the address line and the data line. The polarization direction of the light beams passing through the portion of the liquid crystal layer 23 is thereby altered.

Meanwhile, the second substrate 22 is composed of: a glass substrate 22a; a micro-lens array 22b formed on one side of the glass substrate 22a (the light-emerging side in the figure); cover glass 22c closely placed on the micro-lens array 22b; and the opposing electrode 22d formed on the cover glass 22c.

The opposing electrode 22d is a transparent electrode formed on the entire surface or required regions (i. e., at least the regions opposing the pixel electrodes 21B, 21R, and 21G of the first substrate 21) of the cover glass 22c. The electric potential of the opposing electrode 22d is fixed at a constant value.

The micro-lens array 22b can be formed as gradient index lenses by a selective ion diffusion method, however, it may be formed by other methods. Although each micro-lens ML composing the micro-lens array 22b is generally formed as a plano-convex lens whose axis is perpendicular to the plane of the figure, it may be a general spherical lens or nearly spherical lens having a curved face. Furthermore, although the light-incident side of the micro-lenses MLs is convex and the light-emerging side is flat in this embodiment, alternatively, the light-incident side of the micro-lenses MLs may be flat and the light-emerging side may be convex.

The micro-lens array 22b is formed such that one micro-lens is arranged for every three pixel electrodes 21B, 21R, and 21G of the first substrate 21. The light beams B, R, and G entering the micro-lenses from three different directions are collected, pass through the liquid crystal layer 23, and then, enter the pixel electrodes 21B, 21R, and 21G, respectively. For example, concerning the R light beam, the focal point $F_R$ of the micro-lens array 22b is positioned deep inside the glass substrate 21a, but not on or near the pixel electrode 21R. In other words, the focal length f of the micro-lens is set longer than the distance d between the pixel electrode 21R and the principal point A of the micro-lens. Therefore, the R light beam emerging from the micro-lens passes through the pixel electrode 21R while not being completely focused. Light beams of other colors (the B and G light beams) behave similarly to the above. This is a notable feature of the present invention.

The operation of a liquid crystal display device having the above structure will be explained.

As shown in FIG. 1, the parallel white light 11 coming from a light source (not shown in the figure) is color-separated into the three light beams B, R, and G having mutually different wavelength ranges by the dichroic mirrors 12B, 12R, and 12G, respectively. The three light beams B, R, and G are linearly polarized by a polarizer not shown in the figure, and then, enter the micro-lens array 22b of the LCD panel 20 from mutually different directions. Explanation will be made of light beams entering one micro-lens ML of the micro-lens array 22b. Since the R light beam perpendicularly enters the glass substrate 22a, it focuses inside the glass substrate 21a after passing through the pixel electrode 21R through which the optical axis of the micro-lens Ml passes. The B light beam enters the glass substrate 22a at an incident angle θ, is refracted at a refractive angle ψ enters the micro-lens ML at an incident angle ψ, is transmitted through the pixel electrode 21B through which the line making an angle ψ with the optical axis of the micro-lens Ml passes (not shown in the figure), and focuses at a focal point $F_B$ inside the glass substrate 21a. Similarly, the G light beams enters the glass substrate 22a at an incident angle θ, is refracted at a refractive angle ψ, enters the micro-lens ML at an incident angle ψ, is transmitted through the pixel electrode 21G through which the line making an angle ψ with the optical axis of the micro-lens Ml passes (not shown in the figure), and focuses at a focal point $F_G$ inside the glass substrate 21a.

At this time, the voltage applied to the pixel electrodes 21B, 21R, and 21G varies in response to the pixel signals, and correspondingly, the polarization directions of the B, R, and G light beams are modulated, while passing through the liquid crystal layer 23.

The B, R, and G light beams then focus inside the glass substrate 21a of the first substrate 21, diverge again at divergence angles of $\phi_B$, $\phi_R$, and $\phi_G$, respectively, emerge form the glass substrate 21a, selectively pass through the polarizer not shown in the figure, and are collected by the projection lens 30 to be color-synthesized on the screen 40.

With the distance between the principal point A of the micro-lens ML and the pixel electrodes 21B, 21R, and 21G being d and the pixel pitch (the pitch of the pixel electrodes 21B, 21R, and 21G) being p, d and p must satisfy the following equation (1):

$$d \cdot \tan\psi = p \quad (1)$$

According to Snell's law, $\psi$ and $\theta$ have the following relationship of equation (2):

$$n_{Air} \cdot \sin\theta = n_{SUB} \cdot \sin\psi \quad (2)$$

wherein $n_{Air}$ and $n_{SUB}$ are the refractive index of air and the refractive index of the glass substrate 22a, respectively.

The advantages of this embodiment will be explained as compared with a case in which the focal points of the micro-lens ML are positioned on or near the pixel electrodes 21B, 21R, and 21G of the first substrate 21.

Figure 3:
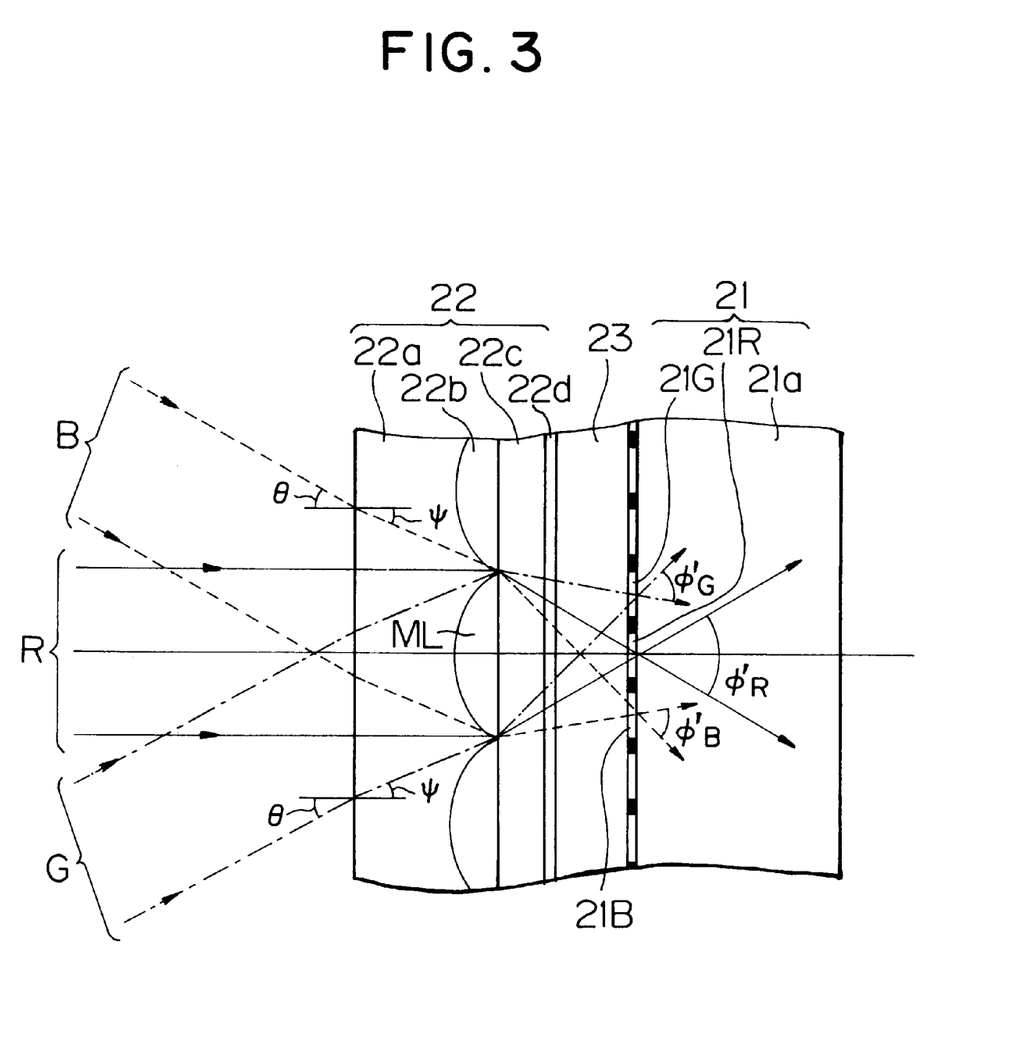
FIG. 3 is a cross-sectional diagram showing the structure and operation of an LCD panel;.

FIG. 3 is a diagram showing the case in which the focal points of the micro-lens ML are positioned on or near the pixel electrodes while the distance between the micro-lens ML and the pixels is the same as that of FIG. 2, in other words, the structure of an inside opposing-substrate type in which micro-lenses are arranged on the light-emerging surface of the second substrate, as is described in the document (ii). In this figure, the numerals identify substantially identical parts in FIG. 2, and detailed explanations thereof are omitted.

As is shown in this figure, the B, R, and G light beams entering the micro-lens ML from different directions are respectively collected and focused on the pixel electrodes 21B, 21R, and 21G of the first substrate 21. At this time, with the focal length of the micro-lens ML in air being f' and the pixel pitch (the pitch of the pixel electrodes 21B, 21R, and 21G) being p, the incident angles (i. e., the angles made with the R light beam) $\theta$ satisfy the following equation (3), as is mentioned in the above documents:

$$\tan\theta = p/f' \quad (3)$$

In such a case, the divergence angles of the B, R, and G light beams after focusing are $\phi_B'$, $\phi_R'$, and $\phi_G'$, respectively, which are considerably larger than the divergence angles $\phi_B$, $\phi_R$, and $\phi_G$ of the present embodiment (FIG. 2). In other words, the divergence angles $\phi_B$, $\phi_R$, and $\phi_G$ can be reduced by setting the focal length f of the micro-lens ML longer than the distance d between the micro-lens ML and the pixel electrodes 21B, 21R, and 21G while setting the focal points inside the glass substrate 21a of the first substrate 21. As a result, according to a liquid crystal display device of this embodiment, the divergence angles of the emerging light beams from the LCD panel 20 decrease, and thus, eclipses do not occur even if the projection lens 30 has a small effective diameter (i. e., has a high F number). Therefore, low-cost lenses having a high F number can be used as the projection lens 30, which constitutes a large part of the cost of the liquid crystal display device.

A preferred example incorporated in this embodiment will be described.

In FIG. 2, the focal point $F_R$ is at a position approximately 120 $\mu$m inside the glass substrate 21a from the pixel electrode 21R, with the pixel pitch p being 20 $\mu$m, the focal length f of the micro-lens ML in air being 230 $\mu$m (336 $\mu$m in a quartz substrate having a refractive index of 1.46), the distance d between the micro-lens ML and the pixel electrodes 21B, 21R, and 21G being 217 $\mu$m, and the incident angle $\psi$ at the micro-lens ML being 5.3° ($\psi$=7.7°). In such a case, although the collected diameter projected on the pixels (i. e., the diameter of the light beam at the position where the R light beam passes through the pixel electrode 21R) is approximately 21.2 $\mu$m, color mixing does not readily occur, since the sum of the pixel pitch 20 $\mu$m and the opaque region width of 4.5 $\mu$m is 24.5 $\mu$m. Thus, according to this embodiment, the collected diameter projected on the pixels is required to not exceed the sum of the pixel pitch and the opaque region width.

Since color mixing depends on not only the collected diameter but also the angular distribution of the incident light, it is necessary to use a lamp having the shortest possible arc length as the white light source to obtain uniformly collimated light. For example, when a metal halide lamp having an arc length of 1.4 mm is employed, the incident light from the lamp has an angular distribution of from −3.5° to +3.5°, as is shown in FIG. 5. However, color mixing does not cause a practical problem because the incident angle having the peak intensity is around 1°.

According to this example (FIG. 2), the maximum light-emerging angle from the LCD panel 20 is approximately 18.7° with respect to the normal line of the LCD panel 20. Thus, the F number of the projection lens 30 is set to approximately 1.5 so as to collect all the emerging light.

Figure 4:
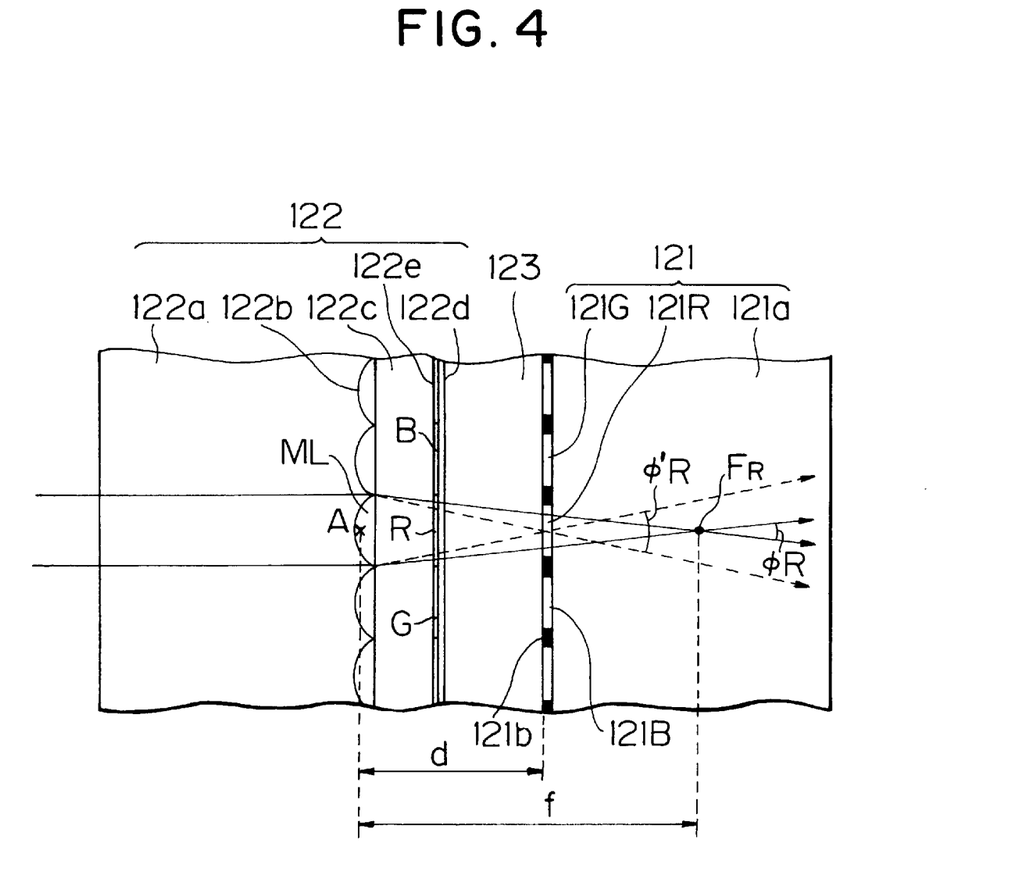
FIG. 4 is a cross-sectional diagram showing the structure of an LCD panel in a projection type liquid crystal display device of another embodiment incorporated in the present invention.

When light beams are allowed to focus on the pixel electrodes 21B, 21R, and 21G, as is shown in FIG. 4, and the focal length of the micro-lens ML in air is set to 150 $\mu$m, the maximum light-emerging angle from the LCD panel 20 is approximately 22.7°. Thus, the F number of the projection lens 30 must be lower than 1.5, approximately 1.3, for collecting all the emerging light, increasing the production cost of the projection lens 30.

The possibility of reducing the maximum light-emerging angle from the LCD panel 20 by other methods including conventional methods will be investigated below.

First, the maximum light-emerging angle from the LCD panel 20 can be reduced by decreasing the refractive angle $\psi$ in the glass substrate 22a. Although the refractive angle $\psi$ can be reduced by decreasing the incident angle $\theta$ with respect to the glass substrate 22a, it is necessary to further improve the collimation of the incident light of each color to prevent color mixing. However, when the collimation of the incident light is improved to decrease the distribution range of the light divergence angle, the total amount of the incident light entering the LCD panel 20 is reduced in the optical system, as is shown in FIG. 5. Brightness is thereby reduced, in other words, improvement of luminance, which is the essential object of the usage of micro-lens, cannot be achieved.

Secondly, a case will be discussed in which micro-lenses are positioned on the light-incident surface of a second substrate of a LCD panel, as is described in the above-mentioned document (i). In such a case, the thickness of the second substrate is approximately 1.1 to 0.7 mm. Assuming that the thickness of the second substrate is 0.7 mm, which is the lower limit, the focal length of the micro-lenses is approximately 0.7 mm (700 $\mu$m). Therefore, the incident angle $\theta$ satisfying equation (3) is 1.8°. However in practice, when the angles between the incident light beams are set within 1.8°, the total amount of light in the optical system is disadvantageously reduced similarly to the above.

Furthermore, the angles made between two successive mirrors of the three dichroic mirrors must be 0.9° (=θ/2), which is practically very difficult and unrealistic to adjust. Assuming that the thickness of the second substrate is 1.1 mm, which is the upper limit, the incident angle θ must be reduced further, resulting in more difficult adjustment.

As is mentioned above, considering the prevention of color mixing and luminance reduction, the focal points of the micro-lenses are set on the pixels in the documents (i) and (ii). However, the focal points of the micro-lenses are not always required to be positioned on the pixels because of the following reasons: color mixing can be practically prevented by reducing the arc length of light source lamps or optimizing the light-separation properties of the dichroic mirrors; and with respect to the luminance reduction, no problem occurs when light beams are allowed to pass through the aperture portion of each pixel. The present invention aims at achieving this point, and accordingly, the focal points of the micro-lenses are positioned inside the first substrate but not on the pixels.

In the prior arts including documents (i) and (ii), TFTs made of amorphous silicon are employed, with the pixel pitch being approximately 100 μm. Therefore, the eclipse problem in the projection lens does not occur in conventional systems in which the focal points of the micro-lenses are set on the pixels, and such a problem has not been recognized. However, in the trend of requiring higher image quality, the F number of the projection lens must decrease to a considerably low value according to conventional methods when the pixel pitch is reduced to approximately 20 μm or less for achieving higher resolution with the TFTs made of polysilicon. Thus, the difficulty and cost for producing projection lenses inevitably increase. The present invention is extremely effective in solving such problems and can sufficiently cope with the demand for higher resolution, which is supposed to be more intense in the future.

Another embodiment of the present invention will be explained below.

FIG. 4 shows an enlarged cross-sectional structure of an LCD panel in a projection type liquid crystal display device of another embodiment incorporated in the present invention. In this embodiment, color-separation by dichroic mirrors, as is shown in FIG. 1, is not employed. A micro-lens and a color filter are arranged for every pixel so as to achieve color display. As is shown in FIG. 4, the LCD panel has: a first substrate 121 on which numerous pixel electrodes are arranged according to a matrix pattern; a second substrate 122 having an opposing electrode, micro-lenses, and color filters; and a liquid crystal layer 123 sandwiched between the first substrate 121 and the second substrate 122. The first substrate 121 is composed similarly to the first substrate 21 of FIG. 2 and has: a glass substrate 121a; pixel electrodes 121B, 121R, and 121G regularly arranged on the light-incident side of the glass substrate 121a according to a matrix pattern; and opaque regions 121b composed of TFTs (not shown in the figure) which are used as switching elements for applying a voltage to the pixel electrodes in response to the image signals. Since the system of applying signal voltage to each pixel electrode (i. e., the structure and switching drive system of the TFTS) is similar to that of FIG. 2, the explanation is omitted.

Meanwhile, the second substrate 122 has: a glass substrate 122a; a micro-lens array 122b formed on the light-emerging side of the glass substrate 122a; cover glass 122c closely placed on the micro-lens array 122b; color filters 122e, for the B, R, and G light beams, formed on the cover glass 122c corresponding to the pixels; and an opposing electrode 122d formed on the color filters 122e. The color filters 122e are not always required for three-panel system projectors.

The structure and operation of the opposing electrode 122d is similar to those of the opposing electrode 22d of FIG. 2. The micro-lens array 122b is formed such that one micro-lens is arranged for each of the pixel electrodes 121B, 121R, and 121G of the first substrate 121. The collimated light coming from a light source (not shown in the figure) enters and is collected by all the micro-lenses MLs, passes through the corresponding color filters 122e to form color light beams B, R, and G, and after passing through the liquid crystal layer 123, the color beams enter the pixel electrodes 121B, 121R, and 121G, respectively. In other words, differently from the case of FIG. 2, the optical axes of color light beams B, R, and G are parallel to each other in this embodiment.

Concerning the R light beam, the focal point $F_R$ of the micro-lens array 122b is positioned deep inside the glass substrate 121a but not on or around the pixel electrode 121R. In other words, the focal length f of the micro-lenses is set longer than the distance d between the pixel electrode 121R and the principal point A of the micro-lens array 122b. Therefore, the R light beam emerging from the micro-lens passes through the pixel electrode 121R while not being completely focused. Light beams of other colors behave similarly to the above.

In this embodiment, the focal points of the micro-lenses are positioned in the first substrate 121 but not on the pixel electrodes, as is similar to the case of FIG. 2, thus even when the distance d between the micro-lens array 122b and the first substrate 121 decreases with the reduction in the pixel pitch, the focal length of the micro-lenses can be set to a larger value than d. Therefore, the divergence angle $\phi_R$ of this case is smaller than the divergence angle $\phi_R'$ of the case in which the focal points of micro-lenses are positioned on the pixel electrodes (shown by dashed lines in the figure). As a result, the emerging angle from the LCD panel is reduced. Thus, it is not necessary to significantly decrease the F number of the projection lens (not shown in the figure) used for synthesizing the color image on the screen. Production costs are thereby reduced.

For example, the focal point of the micro-lenses is at a position approximately 128 μm inside the glass substrate 121a from the pixel electrode 121R, when the pixel pitch p is 32 μm, the focal length f of the micro-lenses in air is 180 μm, and the distance d between the principal point of the micro-lenses and the pixel electrodes is 135 μm. In this case, the maximum light-emerging angle from the LCD panel is approximately 13.8° with respect to the normal line of the LCD panel (when a light beam having a divergence angle of +/−8° enters). Thus, the F number of the projection lens is approximately 2.3. Meanwhile, in the case of setting the focal point on the pixels similarly to prior art, the maximum light-emerging angle is approximately 18.10, and thus the F number of the projection lens must be set to lower than 2.3. Therefore, according to the present embodiment, a projection lens which can be more readily produced at lower cost as compared with prior art can be used, thereby achieving cost reduction of the device as a whole.

Although the present invention has been explained with reference to embodiments in the above, the present invention is not restricted to those embodiments and various modifications can be effected within the spirit and scope of the invention. For example, although the pixel driving TFTs are placed on the pixel-electrode side in the above embodiments, they may be positioned on the second-substrate side. In addition, with respect to the central light, the incident angles of the other two color light beams are the same θ as in the embodiment shown in FIGS. 1 and 2, however these incident angles may be different from each other. In such a case, the pixel pitch must be changed correspondingly.

In addition, although the color filters 122e are positioned on the light-emerging side of the cover-glass substrate 122c in the embodiment shown in FIG. 4, they may be arranged on the light-incident side (micro-lens side). Moreover, the color filters can be omitted in the case of a monochrome type liquid crystal display device. Furthermore, the present invention can be applied to a system, such as three-panel system projectors and projection TVs, in which micro-lenses are fixed to monochrome liquid crystal panels arranged in the corresponding optical paths of B, R, and G light so as to also achieve higher luminance.

Large screen displays by a magnifying optical projection system utilizing a liquid crystal panel are classified into single-panel systems composed of a single liquid crystal panel having color filters and three-panel systems not having color filters. According to the three-panel systems, light beams separated into the primary colors R, G, and B having mutually different wavelength ranges are collected to display dots in a liquid crystal panel so as to reproduce a color image, as is shown in FIG. 1. In other words, separate liquid crystal panels are provided for each of the primary colors R, G, and B, and light beams modulated by the corresponding liquid crystal panels are synthesized and projected on a screen by one projection lens.

Figure 6:
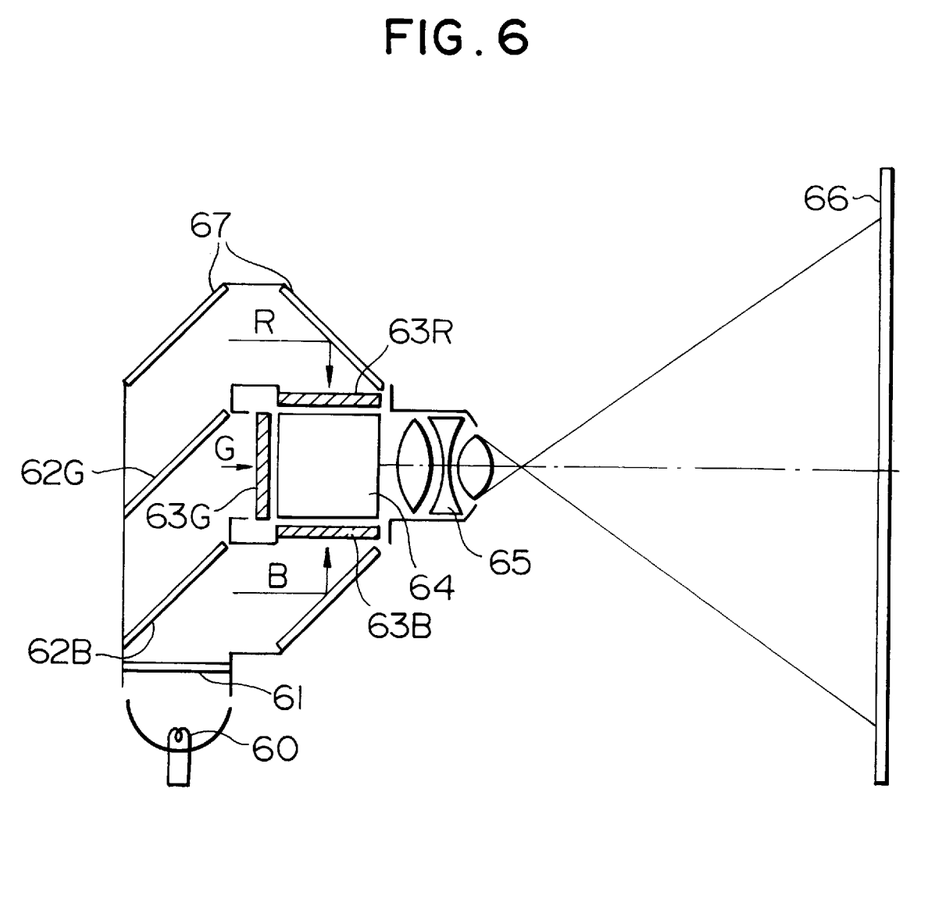
FIG. 6 is a cross-sectional diagram showing an optical system of an LCD panel of an embodiment incorporated in the present invention.

FIG. 6 is a cross-sectional diagram showing the structure of an optical system of an LCD panel of an embodiment, in which a dichroic prism is employed in the optical system for color synthesis. Light from a light source 60 passes through an interference filter 61. A dichroic mirror 62B reflects the B light such that the direction of the B light changes by 90° directing it towards a liquid crystal panel 63B, and transmits light of the other colors (R and G). The transmitted light impinges on a second dichroic mirror 62G which reflects the G light directing it towards a liquid crystal panel 63G, and transmits the R light which is directed towards a liquid crystal panel 63R by mirrors 67. As is mentioned above, the separated light beams of R, G, and B are allowed to enter three liquid crystal panels 63R, 63G, and 63B, respectively. In each of the liquid crystal panels 63R, 63G, and 63B, an image corresponding to the color of the panel is reproduced and the incident light beam of each color is modulated. The modulated incident light beams enter a dichroic prism 64 from mutually different directions. A color image is synthesized in the dichroic prism 64, and then, projected on a screen 66 by a projection lens 65. In the liquid crystal panels of such a projection display device, a micro-lens and a pixel electrode are arranged for each pixel. Simpler design and lower costs for projection lenses can be achieved by positioning the focal points of the micro-lenses inside the pixel substrate so as to increase the F number of the projection lens.

As explained above, according to a liquid crystal panel of the present invention, the focal length of micro-lenses is set to be longer than the distance between the micro-lens array and the first substrate, while light collected by each micro-lens is arranged to focus inside the first substrate. Thus, the divergence angle after focusing can be reduced. Therefore, the maximum light-emerging angle from the LCD panel can be reduced, and eclipse of the light which causes chrominance or luminance non-uniformity does not occur even when a lens having a high F number is used as a projection lens. Thus, difficulty and costs for producing projection lenses can be reduced, thereby advantageously reducing the cost of the device as a whole.

What is claimed is:

1. A liquid crystal panel comprising:
    a first substrate having a plurality of pixel electrodes arranged in a matrix pattern;
    a second substrate opposing said first substrate, said second substrate having a transparent substrate, an opposing electrode opposing said plurality of pixel electrodes, and a micro-lens array provided between said transparent substrate and said opposing electrode; and
    a liquid crystal layer sandwiched between said first and second substrates, wherein the focal length of micro-lenses composing said micro-lens array is set to be longer than the distance between said micro-lens array and said first substrate such that light collected by each of said micro-lenses passes through said pixel electrodes and focuses inside said first substrates,
    and wherein said micro-lenses are arranged such that each micro-lens opposes more than one pixel electrode.

2. The liquid crystal panel as set forth in claim 1, wherein a color filter is provided between said opposing electrode and said micro-lenses.

3. A projection type display device comprising:
    a light source;
    means for separating light from said light source into a plurality of light beams having mutually different wavelength ranges;
    a liquid crystal panel in which said light beams enter, said liquid crystal panel including:
        a first substrate having a plurality of pixel electrodes arranged in a matrix pattern;
        a second substrate opposing said first substrate, said second substrate having a transparent substrate, an opposing electrode opposing said plurality of pixel electrodes, and a micro-lens array provided between said transparent substrate and said opposing electrode; and
        a liquid crystal layer sandwiched between said first substrate and said second substrate, wherein the focal length of micro-lenses composing said micro-lens array is set to be longer than the distance between said micro-lens array and said first substrate such that light collected by each of said micro-lenses passes through said pixel electrodes and focuses inside said first substrate; and
    means for synthesizing said light beams transmitted through said liquid crystal panel and modulated therein on a display screen.

4. The projection type display device as set forth in claim 3, wherein said micro-lenses are arranged such that each micro-lens opposes more than one pixel electrode.

5. The projection type display device as set forth in claim 3, wherein said light separating means is at least one selected from the group consisting of dichroic mirrors, a hologram element, a diffraction grating, or a prism.

6. The projection type display device as set forth in claim 3, further comprising a color filter disposed between said opposing electrode and said micro-lenses.

7. The projection type display device as set forth in claim 3, wherein said micro-lenses are arranged such that each micro-lens opposes more than one pixel electrode.

8. A projection type display device comprising:
    a light source;

means for separating light from said light source into a plurality of light beams having mutually different wavelength ranges;

a plurality of liquid crystal panels in which said light beams enter, respectively, each of said liquid crystal panels including:

a first substrate having a plurality of pixel electrodes arranged in a matrix pattern;

a second substrate opposing said first substrate, said second substrate having a transparent substrate, an opposing electrode opposing said plurality of pixel electrodes, and a micro-lens array provided between said transparent substrate and said opposing electrode; and a liquid crystal layer sandwiched between said first and second substrates, wherein the focal length of micro-lenses composing said micro-lens array and said first substrate such that light collected by each of said micro-lenses passes through said pixel electrodes and focuses inside first substrate; and means for synthesizing said light beams from said liquid crystal panels on a display screen.

9. The projection type display device as set forth in claim 8, wherein each of said micro-lenses opposes each of said pixel electrodes in said first substrate.

10. The projection type display device as set forth in claim 8, wherein light beams of the primary colors Red, Green, and Blue are incident on said liquid crystal panels.

11. The projection type display device as set forth in claim 8, further comprising a color filter disposed between said opposing electrode and said micro-lenses.

12. The projection type display device as set forth in claim 8, wherein said micro-lenses are arranged such that each micro-lens opposes more than one pixel electrode.

* * * * *